W. COPPAGE.
Plow.
No. 222,576. Patented Dec. 16, 1879.
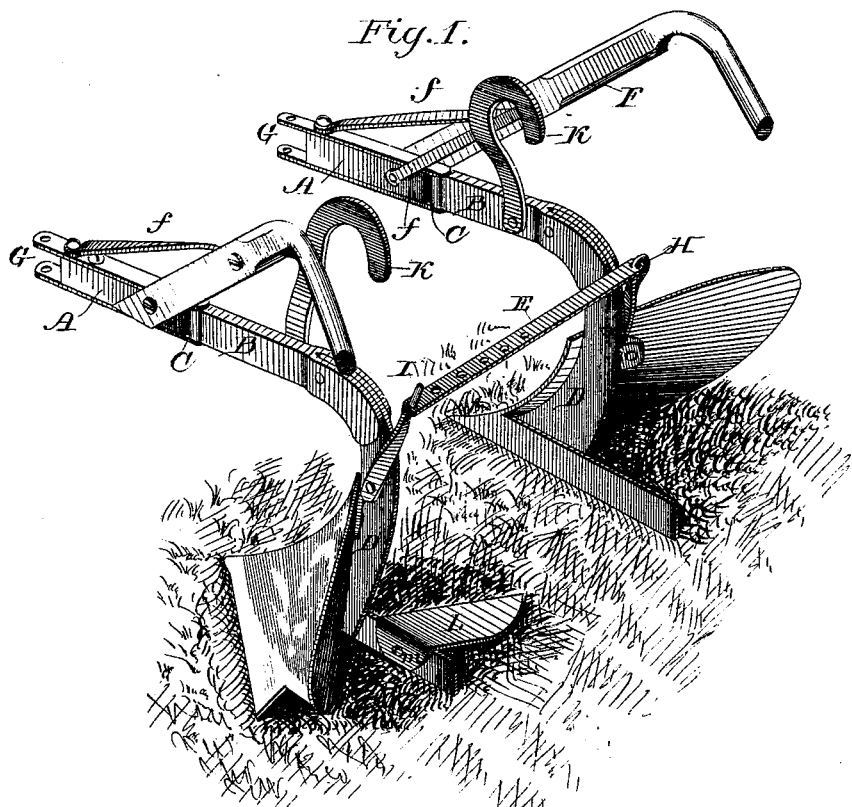
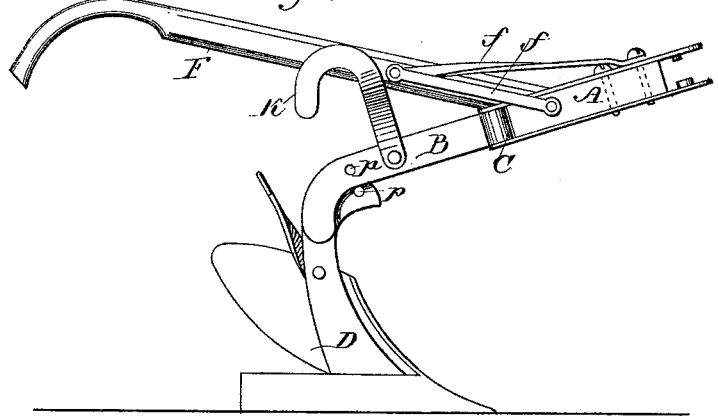
Witnesses:
E. M. Huston
George Coppage
B. E. Strange
Inventor:
William Coppage

UNITED STATES PATENT OFFICE.

WILLIAM COPPAGE, OF VIGO COUNTY, INDIANA.

IMPROVEMENT IN PLOWS.

Specification forming part of Letters Patent No. 222,576, dated December 16, 1879; application filed September 29, 1879.

*To all whom it may concern:*

Be it known that I, WILLIAM COPPAGE, of Vigo county and State of Indiana, have invented certain new and useful Improvements in Plows used in the cultivation of crops, the invention being a joint in the beam, and a handle placed on the end section for the purpose of guiding the plow; and I declare the following is a full and explicit description thereof, reference being had to the accompanying drawings, in which—

Figure 1 is a perspective view, and Fig. 2 is a side elevation.

The object of my invention is to overcome the difficulty in guiding bar-share or mold-board plows, so they can be used double in cultivating crops.

The nature of my invention consists in making a joint about the middle of the beam which will only work horizontally, and attaching the handle to the section of the beam next to the plow-carriage.

In order that others may understand and make use of it, I will proceed to describe the construction and operation of the same.

The section of my beam marked A in Fig. 1 has iron straps securely bolted above and below, extending far enough beyond the end of the beam at G to be fastened with a bolt to the carriage or axle, as ordinary cultivators are attached. The straps extend back over the joint C sufficiently far to receive a bolt passing through the point of the beam of section B, thus forming the joint C, and fitting so as to work only horizontally.

My handle F is attached near the joint to the beam A, and securely fastened there by braces *f f*. Now, when I desire to guide the plow to the right, I push the handle F in that direction, and then, the end G being fastened to the carriage, the joint C, to which the beam B is attached, is suddenly thrown to the right, changing the point of draft and turning the plow accordingly; and pushing the handle to the left will, for the same reason, turn the plow in that direction.

Fig. 1 represents the two plows as they will be used in throwing the dirt from the row; and in order to make them throw the dirt to the row it is only necessary to change them from side to side, and then they will throw the mold or dirt to the row.

I attach the two by a jockey brace or stay, (marked E.) This is only intended to be used occasionally, and I make no claim upon it.

To the land-side I attach a knife, (marked L,) which I call a "fin-share," which is made of iron or steel and sharp, with sufficient strength to go through the soil and cut any weeds that may be left in the middle of the row. It is attached to the bar by a screw at *m*, and can be removed at pleasure. It is only intended to be used in plowing to the row.

The standard is attached to the rear section of the beam by a pivot-bolt and a wooden pin through the holes *p p*, so that in case the point of the plow should catch on a root or other substance the pin will give way and save breakage. This invention has long been used in shovel-plows, and I have applied it to bar-share plows.

I therefore claim as my invention—

A sectional plow-beam or drag-bar consisting of the forward part, A, having a handle rigidly attached thereto, and the rear curved section, B, hinged to allow free lateral movements of the plow, substantially as shown and described.

WILLIAM COPPAGE.

Witnesses:
WILLIAM MACK,
JOHN R. ALLEN.